Oct. 20, 1925.
E. WENZEL
NAP RAISING MACHINE
Filed Sept. 4, 1923
1,557,750
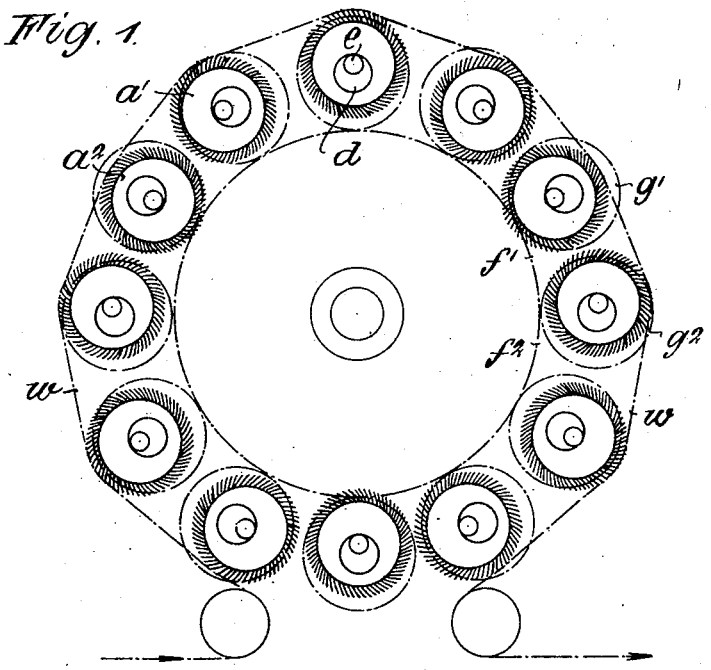
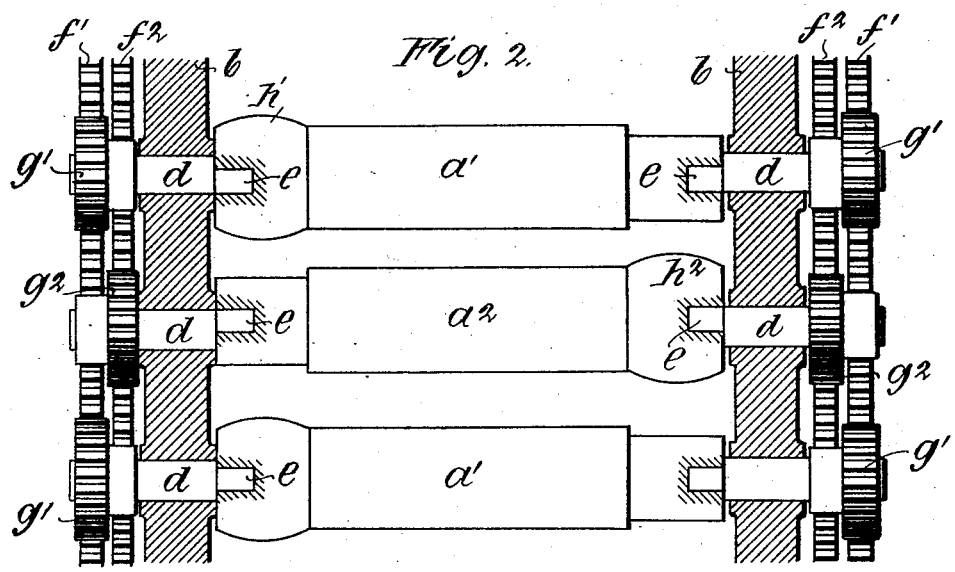

Patented Oct. 20, 1925.

1,557,750

UNITED STATES PATENT OFFICE.

EMIL WENZEL, OF AUE, GERMANY.

NAP-RAISING MACHINE.

Application filed September 4, 1923. Serial No. 660,790.

*To all whom it may concern:*

Be it known that I, EMIL WENZEL, a citizen of the German Realm, residing at Aue i/Erzgebirge, Germany, have invented certain new and useful Improvements in Nap-Raising Machines, of which the following is a specification.

In the well known nap-raising machines with card rollers provided on a raising cylinder the greatest working effect occurs at those points where the card rollers come into and out of contact with the cloth. Thus, it has already been proposed to give to the nap-raising rollers, in addition to their rotational motion around their own axes, a separate motion around the axis of the cylinder for the purpose of thereby increasing their effective action. According to the known proposal the nap-raising rollers have been mounted with their journal bearings in guide slots in the end walls of the cylinder, these guide slots being arranged to extend in an arc-shaped or straight direction at a more or less steep acute angle to the tangent of their point of intersection with the periphery of the cylinder. In apparatus of that type the nap-raising rollers strike the cloth with a blow as it were. The mutual coming into and out of contact take place more rapidly than is suitable for a proper nap-raising action. The separate motion of the nap-raising rollers alternately outwards and inwards in their guide slots necessitates a complicated separate drive. Moreover, oscillations of the masses are produced which impair the uniformity of the nap-raising action since they disturb the steady running of the cylinder.

It has also been proposed to mount the raising rollers in sets on subsidiary cylinders arranged round the main cylinder shaft in such a manner that the raising rollers will be rotated about the axes of the subsidiary cylinders as well as about their own axes. In this case the raising rollers have to move through a much greater distance than is necessary to move them into and out of contact with the cloth and moreover only a small proportion of the total number of rollers employed can be brought into action at one time, namely only one roller of each set.

The present invention has for its object to overcome the drawbacks above referred to, and with this object in view the invention consists in providing means interposed between the raising rollers and the ends of the raising cylinder for imparting eccentric movement to the individual nap raising rollers. The ends of the nap raising rollers are rotatably mounted on pins provided on stub shafts journalled in the ends of the raising cylinder, the axes of the rollers being offset with respect to the axes of the stub shafts. These stub shafts are furnished with toothed wheels meshing with large toothed wheels that are located by the side of and coaxially with the cylinder. The rollers are provided in the known manner with small belt pulleys which are driven by the usual driving belts for the purpose of causing the nap-raising rollers to revolve around their own axes.

As the cylinder rotates, the stub shafts rotate also around their own axes because the small toothed wheels roll over the large toothed wheels and by this means the nap-raising rollers are carried round in small circular paths about the axes of the stub shafts during their rotation about their own axes. In this manner, during the rotation of the cylinder, the nap-raising rollers receive a continual outward and inward motion, but since this motion is itself circular, the said rollers come into and out of contact with the cloth without shock.

One embodiment of this invention is illustrated by way of example in the accompanying drawings in which:

Figure 1 is a diagrammatic cross-section of a nap-raising drum embodying the improvements of this invention, and Fig. 2 is a plane development of a portion of the periphery of the said drum.

As shown, the rollers $a^1$ and $a^2$ which are arranged to run alternately with and against the direction of the cloth, are mounted in the usual manner around the periphery of the cylinder. They are carried at each end of the cylinder in a spider $b$; both spiders are fixed on the axle of the cylinder.

In the spiders $b$ there are mounted stub shafts $d$ which are provided in their turn with eccentric pins $e$ that carry the various rollers $a^1$ and $a^2$.

Concentrically to the axis of the cylinder there are located at each end of the cylinder two internally toothed rings $f^1$ and $f^2$ which drive the groups of rollers $a^1$ and $a^2$ in a manner known per se through spur wheels $g^1$ and $g^2$. The respective pairs of toothed wheels $g^1$ and $g^2$ are mounted of course in such a manner that the eccentric pins $e$ that are arranged together in pairs carry each a roller and occupy correspondingly similar positions.

The rollers $a^1$ and $a^2$ are provided with the usual driving pulleys $h^1$ and $h^2$ at opposite ends of the machine for the purpose of rotating the said rollers about their axes on their supporting pins $e$, the pulleys $h^1$ and $h^2$ being driven by two belts (not shown) which encircle the pulleys.

The nap-raising rollers can be brought into operation through the rotation of the cylinder and by causing the rings of teeth $f^1$ and $f^2$ to rotate at different speeds and also in the same or in opposite directions in any desired manner. At the same time by allowing the belts that engage the belt pulley seats $h^1$ and $h^2$ to remain stationary or by actuating the said belts, the rollers $a^1$ and $a^2$ can be caused to rotate in any determined manner around their supporting pins $e$ which are mounted eccentrically on the stub shafts $d$.

According to the chosen speed ratio of the gearings the centres of the nap-raising rollers are enabled during the rotation of the cylinder to move in their own circular paths and thus execute oscillating or pendulating movements relatively to the cloth travelling round the said rollers. By suitably changing the gearings the direction of motion of the eccentric pins $e$ can be varied in relation to the direction of the rotation of the cylinder, and thus the nap-raising action of the two series of rollers can be reversed with instant result. A special effect can be produced by means of the improved machine also by stopping the cylinder and allowing the driving mechanism to act only upon the stub shafts $d$, whilst braking the rollers $a^1$ and $a^2$ by means of their belts. If the braking of the rollers is strong enough, it may happen that the entire cylinder (if it is suitably constructed and mounted in bearings) will revolve against the cloth backwards in relation to the direction of the card clothing.

The use of the improved machine also renders possible the production of all straight nap felting effects or half-felting effects such as they are obtained with ordinary nap-raising machines. If, while the cylinder is rotating, the stub shafts $d$ are not rotated, but are stopped relatively to the drum, the rollers $a^1$ and $a^2$ can then be driven in the usual manner solely by means of belts passing round their pulley seats $h^1$ and $h^2$. The improved machine can then be used as an ordinary nap-raising machine, but with this advantage that the distance of the rollers from the axis of the cylinder may be varied within certain limits, whereby the great advantage is gained of being able to vary the distance of the rollers (acting with and against the direction of movement of the cloth) from the axis of the drum.

It is to be understood that the cloth $w$ may be guided in a different way from that which is shown diagrammatically in Fig. 1 and that any suitable means may be employed for this purpose.

What I claim is:—

1. A nap raising machine of the card roller type, comprising the combination with a raising cylinder, nap raising rollers provided on said cylinder and means for rotating said raising rollers about their axes, of means interposed between the raising rollers and the ends of the raising cylinder for imparting eccentric movements to the individual nap raising rollers, whereby said rollers are caused to move towards and away from the cloth during their usual rotation.

2. A nap-raising machine of the card roller type, comprising the combination with a raising cylinder, nap raising rollers provided on said cylinder and means for rotating said raising rollers about their axes, of means for imparting eccentric movements to the individual nap raising rollers, said means consisting in stub shafts journalled in the ends of the raising cylinder, pins provided on said stub shafts for rotatably supporting the ends of the nap raising rollers with their axes offset with respect to the axes of the stub shafts and means for imparting angular motion to the stub shafts for the purpose of causing said rollers to move towards and away from the cloth during their usual rotation.

In testimony whereof I have signed my name to this specification.

EMIL WENZEL.